(12) United States Patent
Underwood, IV et al.

(10) Patent No.: US 11,188,216 B2
(45) Date of Patent: *Nov. 30, 2021

(54) SELECTIVELY EMPHASIZING DIGITAL CONTENT

(71) Applicant: Dropbox, Inc., San Francisco, CA (US)

(72) Inventors: George Milton Underwood, IV, Palo Alto, CA (US); Ramesh Balakrishnan, San Francisco, CA (US); Boris Babenko, San Mateo, CA (US); Christopher Lee, Oakland, CA (US); Brian Smith, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/425,627

(22) Filed: May 29, 2019

(65) Prior Publication Data

US 2019/0278471 A1 Sep. 12, 2019

Related U.S. Application Data

(63) Continuation of application No. 14/248,235, filed on Apr. 8, 2014, now Pat. No. 10,346,023.

(Continued)

(51) Int. Cl.
*G06F 3/0485* (2013.01)
*G06F 3/0482* (2013.01)
(Continued)

(52) U.S. Cl.
CPC ........ *G06F 3/04855* (2013.01); *G06F 3/0482* (2013.01); *G06F 16/248* (2019.01);
(Continued)

(58) Field of Classification Search
CPC .... G06F 3/04855; G06F 16/54; G06F 16/248; G06F 16/24578; G06F 3/0482; H04L 67/02; H04L 67/10; H04N 21/4316
See application file for complete search history.

(56) References Cited

U.S. PATENT DOCUMENTS 5,673,401 A 9/1997 Volk et al.
5,819,032 A 10/1998 de Vries et al.
(Continued)

OTHER PUBLICATIONS

Final Office Action from U.S. Appl. No. 16/119,858, dated Jul. 28, 2020, 12 pages.

(Continued)

*Primary Examiner* — Tuyetlien T Tran
(74) *Attorney, Agent, or Firm* — Keller Jolley Preece

(57) ABSTRACT

One or more embodiments increase the visual appeal and organization of presenting digital content items. In particular, one or more embodiments improve the visual appeal of a presentation of digital content items by emphasizing one or more digital content items within the presentation of digital content items. For instance, one or more digital content items may be emphasized within a graphical user interface including a gallery of digital content items. The emphasized digital content items can be selected based on a score reflecting a particular characteristic of the digital content item and/or a metric of user interest in the digital content item. Digital content items with relatively high scores as compared to other digital content items may be emphasized when presented in conjunction with the other digital content items.

20 Claims, 8 Drawing Sheets

Related U.S. Application Data

(60) Provisional application No. 61/945,819, filed on Feb. 27, 2014.

(51) Int. Cl.
   *G06F 16/54* (2019.01)
   *G06F 16/248* (2019.01)
   *G06F 16/2457* (2019.01)
   *H04L 29/08* (2006.01)
   *H04N 21/431* (2011.01)

(52) U.S. Cl.
   CPC ........ *G06F 16/24578* (2019.01); *G06F 16/54* (2019.01); *H04L 67/02* (2013.01); *H04L 67/10* (2013.01); *H04N 21/4316* (2013.01)

(56) References Cited

U.S. PATENT DOCUMENTS

| | | | |
|---|---|---|---|
| 6,366,303 | B1 | 4/2002 | Venolia |
| 6,671,405 | B1 | 12/2003 | Savakis et al. |
| 6,937,254 | B2 | 8/2005 | Nishiyama et al. |
| 6,976,228 | B2 | 12/2005 | Bernhardson |
| 7,437,005 | B2 | 10/2008 | Drucker et al. |
| 7,587,683 | B2 | 9/2009 | Ito et al. |
| 7,634,740 | B2 | 12/2009 | Enomoto et al. |
| D622,729 | S | 8/2010 | Oda et al. |
| 7,877,317 | B2* | 1/2011 | Chow ............. G06Q 40/04 705/37 |
| 7,970,240 | B1 | 6/2011 | Chao et al. |
| 8,237,712 | B2 | 8/2012 | Fagans |
| 8,249,397 | B2 | 8/2012 | Wood et al. |
| 9,111,014 | B1* | 8/2015 | Brown ............. G06F 16/254 |
| 9,372,829 | B1* | 6/2016 | Rahmani ............. G06F 3/04886 |
| 9,836,205 | B2 | 12/2017 | Balakrishnan et al. |
| 10,095,398 | B2 | 10/2018 | Balakrishnan et al. |
| 2001/0043279 | A1 | 11/2001 | Niikawa et al. |
| 2003/0076301 | A1 | 4/2003 | Tsuk et al. |
| 2005/0289482 | A1 | 12/2005 | Anthony et al. |
| 2006/0090141 | A1 | 4/2006 | Loui et al. |
| 2007/0074109 | A1* | 3/2007 | Nagahara ............. G06F 40/103 715/210 |
| 2007/0209025 | A1* | 9/2007 | Jing ............. G06F 16/9038 |
| 2008/0052945 | A1 | 3/2008 | Matas et al. |
| 2008/0235205 | A1 | 9/2008 | Fein et al. |
| 2009/0019031 | A1* | 1/2009 | Krovitz ............. G06F 16/54 |
| 2009/0064029 | A1* | 3/2009 | Corkran ............. G06F 3/0482 715/781 |
| 2009/0171783 | A1* | 7/2009 | Raju ............. G06F 16/58 705/14.26 |
| 2009/0254855 | A1 | 10/2009 | Kretz et al. |
| 2009/0265334 | A1* | 10/2009 | Narayanan ............. G06F 16/58 |
| 2010/0085306 | A1 | 4/2010 | Wu |
| 2010/0095239 | A1 | 4/2010 | McCommons et al. |
| 2010/0229115 | A1* | 9/2010 | Augustine ............. G06F 3/1454 715/800 |
| 2010/0251165 | A1* | 9/2010 | Williams ............. G06F 3/0482 715/784 |
| 2011/0083167 | A1* | 4/2011 | Carpenter ............. H04L 65/403 726/4 |
| 2011/0225549 | A1 | 9/2011 | Kim et al. |
| 2011/0252357 | A1 | 10/2011 | Chaudhri |
| 2011/0265002 | A1 | 10/2011 | Hong et al. |
| 2012/0042279 | A1 | 2/2012 | Naderi |
| 2012/0084731 | A1* | 4/2012 | Filman ............. G06F 16/51 715/838 |
| 2012/0110509 | A1* | 5/2012 | Isozu ............. H04N 7/18 715/830 |
| 2012/0198386 | A1 | 8/2012 | Hautala et al. |
| 2013/0016113 | A1 | 1/2013 | Adhikari et al. |
| 2013/0176256 | A1 | 7/2013 | Hara |
| 2013/0179837 | A1* | 7/2013 | Eriksson ............. G06F 3/04855 715/823 |
| 2013/0222431 | A1* | 8/2013 | Joo ............. G06F 3/0484 345/649 |
| 2013/0318476 | A1 | 11/2013 | Sauve et al. |
| 2013/0332068 | A1* | 12/2013 | Kesar ............. H04W 4/029 701/430 |
| 2014/0013271 | A1* | 1/2014 | Moore ............. G06F 3/04886 715/792 |
| 2014/0123005 | A1 | 5/2014 | Forstall et al. |
| 2014/0125856 | A1* | 5/2014 | Kim ............. G06F 3/0482 348/333.02 |
| 2014/0149936 | A1* | 5/2014 | Wilder ............. G06F 3/0485 715/815 |
| 2014/0282099 | A1* | 9/2014 | Bronder ............. G06F 16/54 715/753 |
| 2014/0337791 | A1 | 11/2014 | Agnetta et al. |
| 2014/0344750 | A1 | 11/2014 | Takahashi et al. |
| 2015/0019545 | A1* | 1/2015 | Chedeau ............. G06Q 50/01 707/725 |
| 2015/0039616 | A1 | 2/2015 | Rolston et al. |
| 2015/0058708 | A1* | 2/2015 | Georgiev ............. G06K 9/00228 715/202 |
| 2015/0058754 | A1 | 2/2015 | Rauh |
| 2015/0062097 | A1 | 3/2015 | Chung et al. |
| 2015/0161205 | A1* | 6/2015 | Beach ............. G06F 16/50 707/748 |
| 2015/0212666 | A1 | 7/2015 | Daniel et al. |
| 2015/0242110 | A1 | 8/2015 | Balakrishnan et al. |
| 2015/0242404 | A1 | 8/2015 | Underwood et al. |
| 2018/0059926 | A1 | 3/2018 | Balakrishnan et al. |
| 2018/0373420 | A1 | 12/2018 | Balakrishnan et al. |

OTHER PUBLICATIONS

Notice of Allowance from U.S. Appl. No. 14/580,189, dated Sep. 30, 2019, 10 pages.
Non-Final Office Action from U.S. Appl. No. 16/119,858, dated Apr. 13, 2020, 13 pages.
U.S. Appl. No. 15/801,301, Aug. 7, 2019, Notice of Allowance.
U.S. Appl. No. 14/248,235, May 9, 2016, Office Action.
U.S. Appl. No. 14/248,235, Oct. 6, 2016, Office Action.
U.S. Appl. No. 14/248,235, Apr. 25, 2017, Office Action.
U.S. Appl. No. 14/248,235, Oct. 23, 2017, Office Action.
U.S. Appl. No. 14/248,235, Mar. 7, 2018, Office Action.
U.S. Appl. No. 14/248,235, Oct. 25, 2018, Office Action.
U.S. Appl. No. 14/248,235, Feb. 25, 2019, Notice of Allowance.
U.S. Appl. No. 14/248,238, Jun. 13, 2016, Office Action.
U.S. Appl. No. 14/248,238, Oct. 25, 2016, Office Action.
U.S. Appl. No. 14/248,238, Feb. 17, 2017, Office Action.
U.S. Appl. No. 14/248,238, Jun. 6, 2017, Office Action.
U.S. Appl. No. 14/248,238, Oct. 10, 2017, Office Action.
U.S. Appl. No. 14/248,238, Feb. 1, 2018, Office Action.
U.S. Appl. No. 14/248,238, May 31, 2018, Notice of Allowance.
U.S. Appl. No. 14/520,210, Feb. 9, 2017, Office Action.
U.S. Appl. No. 14/520,210, Aug. 1, 2017, Notice of Allowance.
U.S. Appl. No. 15/801,301, Apr. 18, 2019, Office Action.
Non-Final Office Action from U.S. Appl. No. 16/119,858, dated Jan. 26, 2021, 10 pages.
Notice of Allowance from U.S. Appl. No. 16/119,858, dated Mar. 24, 2021, 7 pages.

* cited by examiner

SELECTIVELY EMPHASIZING DIGITAL CONTENT

CROSS REFERENCE TO RELATED APPLICATIONS

This application is a continuation of U.S. patent application Ser. No. 14/248,235, filed Apr. 8, 2014, which claims the benefit of priority to U.S. Provisional Patent Application No. 61/945,819, filed Feb. 27, 2014. The aforementioned applications are hereby incorporated by reference in their entirety.

BACKGROUND

1. Technical Field

One or more embodiments of the present disclosure relate generally to presenting a gallery of digital content items for experience by a user. More specifically, one or more embodiments of the present disclosure relate to selectively emphasizing one or more digital content items within an electronic gallery of digital content items.

2. Background and Relevant Art

Computing devices (e.g., computers, tablets, and smart phones) have created numerous ways for people to capture, create, share, view, and otherwise interact with numerous types of digital content items. For example, computing devices allow users to interact with digital photos and digital videos by capturing, sharing, and viewing the digital photos and digital videos. To facilitate navigation of various types of digital content items, many computing systems implement searching and/or viewing tools for locating and/or viewing one or more digital content items, such as photos, videos, or images.

Nevertheless, storing and accessing digital content items suffers from a number of limitations and drawbacks. For example, storing large quantities of digital content items often presents difficulties in navigating the digital content items. For example, while computing systems generally allow searching for and/or locating a digital item by searching a file name, this is difficult where the file name of a digital item is unknown and/or where a specific location of a file is unavailable. Locating and viewing a specific digital item is further complicated when stored among large quantities of digital content items.

To reduce problems associated with locating and/or viewing digital content items, many computing systems implement tools for previewing and/or navigating various quantities of digital content items. For example, computing systems often display reduced images or thumbnail images corresponding to digital items. A user can navigate through a collection of digital content items by scanning thumbnails to view a group of images and/or locate a specific digital item. Nevertheless, while thumbnail images facilitate navigation of digital content items, many difficulties and inefficiencies persist in navigating digital content items.

The display and presentation of thumbnail images is often disorganized and unintuitive. For instance, while a display of thumbnail images enables a user to view an image or preview of a file, navigating a large number of disorganized thumbnails still presents disadvantages. For example, navigating reduced-size thumbnails typically does not provide the same enjoyment as viewing larger sized images because many details of the images or not perceivable within the reduced-size thumbnails. Furthermore, the presentation of thumbnail images generally lacks visual appeal, and users often lose interest while scanning through the large gallery of digital content items. Moreover, a disorganized presentation of digital content items often renders locating a specific digital content item difficult for a user. Further, a disorganized presentation of digital content items often lacks visual appeal.

Accordingly, there are a number of considerations to be made in presenting digital content.

SUMMARY

Embodiments of the present disclosure provide benefits and/or solve one or more of the foregoing or other problems in the art with presenting digital content to a user. In accordance with one or more embodiments, the present disclosure includes features for selectively emphasizing digital content items (e.g., photos, videos, audio) within a gallery of digital content items. For instance, a system can, according to principles described herein, present a gallery of digital content items within a graphical user interface and emphasize a particular digital content item within the graphical user interface in order to draw a user's attention to the particular digital content item. The system can select the particular digital content item based on a score associated with the digital content item. The score may be based on content within the digital content item, characteristics of the digital content item, and/or expected user interest in the digital content item. Accordingly, digital content may be intelligently selected and emphasized in order to tailor a presentation of digital content to a user, cater to the user's interests, and/or increase the visual appeal of the gallery of digital content, thereby improving the user's experience of the gallery of digital content.

One example method according to principles described herein includes presenting a plurality of digital content items in a grid format within a graphical user interface, identifying at least one digital content item for emphasis based on a score associated with the at least one digital content item, and emphasizing the at least one digital content item relative to the other digital content items. Emphasizing the digital content item can include highlighting the digital content item, animating the digital content item, enlarging the digital content item, reshaping the digital content item, brightening the digital content item, zooming in to or out from the digital content item, providing audible prompts for the digital content item, and/or performing any other action to draw a user's attention to the digital content item, as will be explained in more detail below.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

DETAILED DESCRIPTION

The present disclosure provides one or more embodiments for enhancing the experience of a user viewing a gallery of digital content items. In particular, the principles disclosed herein improve the visual appeal of a presentation of digital content items by selectively emphasizing digital content items determined to be of interest to the user. For instance, one or more embodiments described herein emphasize one or more digital content items presented within a graphical user interface including a gallery of digital content items (e.g., presented in a grid format). Each emphasized digital content item can be selected based on one or more scores reflecting a particular characteristic of the digital content item and/or a metric of user interest in the digital content item. Digital content items with relatively high scores as compared to other digital content items may be emphasized when presented in conjunction with the other digital content items. As will be explained in more detail below, emphasizing a digital content item may include distinguishing the digital content item in any suitable way to draw a user's attention to the digital content item. Accordingly, the user's experience with the presentation of digital content is more enjoyable and stimulating.

As used herein, "digital content" refers to any digital data. The terms "digital content item," "content item," and "digital item" can include a data file. Examples of digital content items include, but are not limited to, digital photos, digital video files, digital audio files, document files of all types, streaming content, contact lists, and/or folders that include one or more digital content items. The terms "digital content item," "content item," and "digital item" may refer interchangeably to the digital content items themselves and to representations of the digital content items (e.g., thumbnail images representing the digital content items). A collection of digital content items (or simply "collection"), can include a single type of content item or multiple different types of content items. In addition, a collection can include as few as one content item, but in many instances, a collection can include large numbers of content items. Although the present disclosure provides specific examples related to photo galleries, one will appreciate that the principles described herein may be applied to any other type of digital content items.

Figure 1:
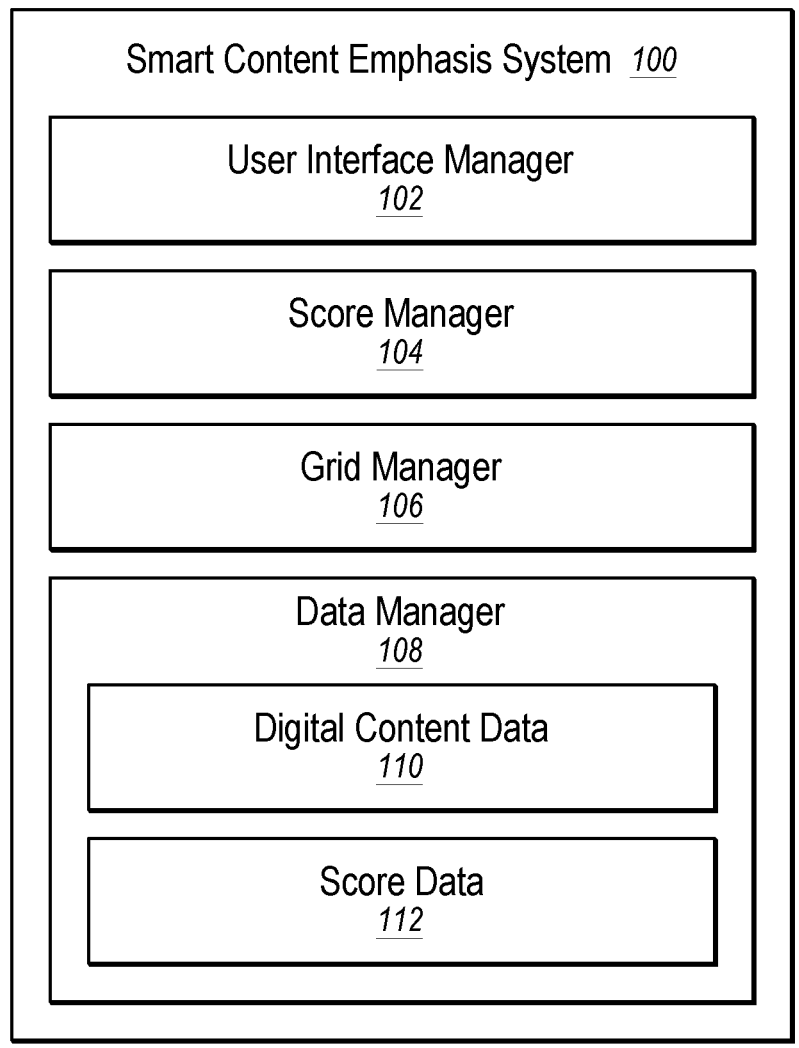
FIG. 1 illustrates a schematic diagram of a system for selectively emphasizing digital content in accordance with principles described herein.

FIG. 1 illustrates an example embodiment of digital content emphasis system 100 (or simply "system 100") in accordance with one or more principles described herein. As shown, system 100 includes user interface manager 102, score manager 104, grid manager 106, and data manager 108. Each of the components 102-108 of system 100 may be in communication with one another using any suitable communication technologies. It will be recognized that although components 102-108 are shown to be separate in FIG. 1, any of components 102-108 may be combined into fewer components, such as into a single component, or divided into more components as may serve a particular embodiment. In addition, components 102-108 may be located on, or implemented by, one or more computing devices, such as those described below in relation to FIG. 10. Alternatively, portions of system 100 can be located on a client device, while other portions of system 100 can be located on an online content management system, such as that described below in reference to FIG. 11.

Components 102-108 can comprise software, hardware, or a combination thereof. For example, components 102-108 can comprise one or more instructions stored on a computer-readable storage medium and executable by one or more processors of one or more computing devices. When executed by the one or more processors, the computer-executable instructions of system 100 can cause a computing device to perform the methods described herein. Alternatively, components 102-108 can comprise hardware, such as a special purpose processing device to perform a certain function or group of functions. Additionally or alternatively, components 102-108 can comprise a combination of computer-executable instructions and hardware.

As mentioned above, and as shown in FIG. 1, system 100 can include user interface manager 102. User interface manager 102 can provide, manage, and/or control a user interface that allows a user to navigate, browse, view, share, manage, and/or otherwise experience a collection of digital content items using system 100. For example, user interface manager 102 can provide a user interface configured to facilitate a presentation of a collection of content items on a computing device. Likewise, user interface manager 102 can provide a user interface configured to facilitate navigation through the collection, as well as browsing of the digital content items.

To illustrate, user interface manager 102 may facilitate presentation of a gallery of digital content items to a user within a graphical user interface. For example, user interface manager 102 may cause a computing device to present a plurality of graphical objects that represent digital content items. For instance, user interface manager 102 can present reduced-size versions of the digital content items, such as thumbnails or icons. In one or more example embodiments, user interface manager 102 can present reduced-size versions of content items in a gallery in a grid format of a user interface as described below with relation to FIGS. 3-8. Further, user interface manager 102 may enable a user to interact with and provide user input to system 100 via the graphical user interface. For instance, user interface manager 102 may facilitate user navigation of the gallery of digital content items.

A gallery of digital content items may include any number of digital content items. The digital content items included in the gallery may include photos, images, videos, media content, or other files. The gallery of digital content items may be presented via a graphical user interface using reduced-size images (e.g., thumbnails) in various formats. In one embodiment, user interface manager 102 can present the gallery of digital content items in a grid view in which digital content items are presented in a grid layout within the graphical user interface. Alternatively, user interface manager 102 can present the digital content items in any other formats, such as vertical or horizontal listings, hierarchal layouts, etc.

As further illustrated by FIG. 1, system 100 can include score manager 104. In one or more embodiments, score manager 104 can generate and/or manage one or more scores associated with digital content items, and utilize the scores to selective one or more digital content items for emphasis within a graphical user interface. In particular, a score associated with a digital content item may indicate an expected user interest in the digital content item. Accordingly, digital content items having higher scores may be emphasized based on the expected user interest in the digital content items.

Scores associated with digital content items may be based on any one or combination of a variety of factors and/or analyses. For example, a score may be based on any one or more of the following: a facial detection analysis, a facial recognition analysis, a presence of a person or persons, facial features (e.g., smiles, open eyes), clarity, sharpness, color, brightness, quality, number of pixels, contrast, aspect ratio, layout, etc. In one or more examples, a score may indicate the presence and/or clarity of a person, a face, or one or more facial features. For example, a digital content item may be assigned a "face score" that is indicative of the presence and/or clarity of a face and/or a particular facial feature within the digital content item. A face score may be based on any number of facial detection and/or recognition analyses. A digital content item having a high score may indicate that the digital content item is likely to include a face of a person, while a digital content item having a low score is unlikely to include a face of a person. Additionally, a digital content item (e.g., an image) including a face making eye contact with a camera may be associated with a higher face score than a digital content item including a face that is not making eye contact with the camera. In some examples, a digital content item having a high face score may be emphasized for a user, as will be explained in more detail below. Other factors, in addition to those stated above, may be used when associating a score with a digital content item. Furthermore, a digital content item can be associated with a plurality of different scores, each representing a different factor or set of factors.

In additional embodiments, scores associated with digital content items may be based on historical and/or social actions performed relative to the digital content items. For example, a score associated with a digital content item may be based on an occurrence, a recency, and/or a frequency of any one or more of the following actions: opening the digital content item, sharing the digital content item, "liking" the digital content item, editing the digital content item, saving the digital content item, or any other suitable action taken with respect to the digital content item. For instance, score manager 104 can assign a score to or associate a score with a digital content item based on how or how much the digital content item has been shared with other users. For example, a digital content item that has been shared can be associated with a higher score than a digital content item that has not been shared. Further, a score associated with a digital item can vary based on the number of people (e.g., users) with whom the digital content item has been shared. For instance, sharing a digital content item with a large number of friends can result in a higher score associated with the digital content item than a digital content item that has been shared with a fewer number of friends. Likewise, a digital content item that is "liked" by more users may have a higher score than a digital content item that is "liked" by fewer users. The score can further vary based on any other suitable actions taken by a user, or by other users, relative to a digital content item.

Score manager 104 can generate, access, and/or otherwise identify a score associated with a digital content item in any suitable manner. For example, in some embodiments, score manager 104 can generate the score by analyzing a digital content item in accordance with any analyses or factors discussed herein. Additionally or alternatively, score manager 104 can access a score associated (e.g., previously associated) with a digital content item. The score may be accessed from a remote database (e.g., an online content management system), a local database, or metadata associated with the digital content item. Accordingly, score manager 104 can identify a score associated with a digital content item in a number of ways.

Utilizing scores associated with digital content items, score manager 104 can identify one or more digital content items for emphasis. For example, score manager 104 may select a digital content item having a relatively high score compared to other digital content items. Additionally or alternatively, score manager 104 may select a digital content item based on a comparison of associated scores with one or more threshold values. For instance, score manager 104 may identify a digital content item to emphasize based on whether a score associated with the digital content item meets or exceeds a threshold value. Additionally, score manager 104 may identify any number of digital content items for emphasis, such as a single digital content item, a group of two or more digital content items, or a predetermined number of digital content items. In some configurations, score manager 104 may identify one or more digital content items to emphasize based on a predetermined percentage of digital content items to emphasize. For example, a setting or preference may indicate that 10% of digital content items within a gallery should be emphasized, and score manager 104 may identify 10% of the digital content items associated with the highest 10% of scores to be emphasized in a presentation of the digital content items (e.g., in a graphical user interface). Additional detail with regard to scoring digital content items and selecting digital content items for emphasis will be described below.

As further illustrated by FIG. 1, system 100 includes grid manager 106. In one or more embodiments, grid manager 106 can manage a grid of digital content items presented within a graphical user interface. In particular, grid manager 106 may arrange the digital content items within a two-dimensional grid having a width equal to a first quantity of digital content items and a length equal to a second quantity of digital content items. For example, and as will be discussed in more detail below, grid manager 106 can arrange the digital content items in a grid including a number of columns of digital content items across a width thereof, and any suitable number of rows of digital content items extending along a length of the grid. The number of columns and/or rows in a grid can be any suitable number based on a desired size, a desired resolution, one or more display screen dimensions, a desired quantity of digital content items to include in the grid, and/or any other factors. Although specific embodiments described herein include a grid having a width of 3 digital content items (e.g., 3 columns of digital content items), in additional or alternative embodiments, any suitable grid width, grid length, digital content item size, and/or number of columns and rows may be implemented as may be desired for a particular implementation. The number of rows in the grid can be equal to the number of rows necessary to include a collection of digital content items in the grid given a particular width or number of columns in the grid.

Grid manager 106 can emphasize a digital content item in any suitable manner to draw a user's attention to the digital content item. For example, grid manager 106 can emphasize a digital content item by highlighting the digital content item, animating the digital content item, resizing the digital content item, reshaping the digital content item, brightening the digital content item, zooming in to or out from the digital content item, providing audible prompts for the digital content item, and/or performing any other action to draw a user's attention to the digital content item. In some embodiments, grid manager 106 may emphasize a digital content item by providing a larger thumbnail of the digital content item relative to other digital content items within the grid. For example, grid manager 106 can enlarge the thumbnail or access a larger thumbnail for a digital content item, and present the larger thumbnail next to relatively smaller thumbnails for other digital content items. To illustrate, within a two-dimensional grid having multiple rows and columns, grid manager 106 can emphasize a digital content items by presenting a thumbnail representative of the digital content that occupies multiple rows and/or columns of the grid, while other digital content items are limited to a single row and/or column. Accordingly, a user's attention is drawn to the emphasized digital content item. Grid manager 106 can emphasize a digital content item in any other suitable manner, such as disclosed in more detail herein.

In some embodiments, grid manager 106 can emphasize a digital content item by cropping or otherwise resizing/reshaping the digital content item or a thumbnail image representative of the digital content item. Prior to cropping a digital content item (e.g., a photo), grid manager 106 may identify a region of interest of the digital content item (e.g., a region of the digital content item including a targeted characteristic). For example, grid manager 106 can detect one or more faces within a digital content item and then crop the digital content item to emphasize a region of the digital content item including the detected faces. Additionally or alternatively, grid manager 106 can zoom into or out of the emphasized region of the digital content item to further emphasize one or more faces and/or facial features within a digital content item. In one or more additional embodiments, grid manager 106 may crop and/or size a digital content item to fit within a space permitted in a grid view. For instance, if each available space within the grid view comprises a square, grid manager 106 can crop and/or resize each digital content item to fit within the available space. Additionally, grid manager 106 may crop the digital content items to avoid cutting off portions of the digital content items that may be of interest when navigating the gallery of photos.

Additionally or alternatively, grid manager 106 may crop a digital content item to have a horizontal or vertical configuration. For instance, where system 100 detects a row of faces arranged horizontally across a digital content item, grid manager 106 may identify a region of interest across a horizontal length of the digital content item and crop the digital content item to emphasize the row of faces. Alternatively, where a digital content item includes a vertical characteristic, such as one or two people standing, grid manager 106 may identify a region of interest across a vertical length of the digital content item and crop the digital content item to emphasize the standing individual(s).

In addition to cropping a digital content item selected for emphasis, grid manager 106 may crop digital content items that have not been selected for emphasis. It is noted that although a digital content item may be cropped when displayed via the graphical user interface, a file associated with the digital content item itself need not be modified. Thus, while grid manager 106 can crop a display of a digital content item to emphasize a particular feature, an original file associated with the presented digital content item, including the non-cropped portion, may still be opened and/or viewed in its original format.

Grid manager 106 may also organize digital content items within a gallery (e.g., grid) of digital content items. Grid manager 106 can organize digital content items based on various factors. For example, grid manager 106 can organize a gallery of digital content items within a grid based on date, time, geographic location, event, category, people, or other characteristics of the digital content items. To illustrate, grid manager 106 can organize a gallery of photos according to a particular category so that similar types of photos are grouped together within the gallery. Within the gallery and/or within a particular category of photos, grid manager 106 may emphasize one or more of the photos based on scores associated with the respective photos. Thus, grid manager 106 may facilitate organization of a particular category of photos as well as emphasize one or more of the photos when presented in a grid within the graphical user interface.

As further illustrated in FIG. 1, system 100 includes data manager 108 for managing digital content data 110 and score data 112. Digital content data 110 can include data representative of one or more digital content items and/or information about one or more digital content items. Additionally, digital content data 110 may include data representative of characteristics of digital content items, such as whether a digital content item is oriented in a landscape or portrait layout and/or whether certain features are included within a digital content item (e.g., faces, facial features).

Score data 112 may include data representative of one or more scores associated with one or more digital content items. Score data 112 may indicate a rank and/or position of digital content items with relation to each other. Score data 112 may further indicate which digital content items are ranked relatively high in comparison to other digital content items. Further, score data 112 may include different types of score data associated with the same digital content item. For example, score data 112 may include a first score associated with a digital content item that is based on the presence of a face in a digital content item. Additionally, score data 112 may include a second score associated with the digital content item based on a different factor, such as the presence of a specific individual in the digital content item. Score data 112 can further include other types of scores associated with respective digital content items. Score data 112 may further include a cumulative score based on multiple types of scores that are associated with respective digital content items.

Figure 2:
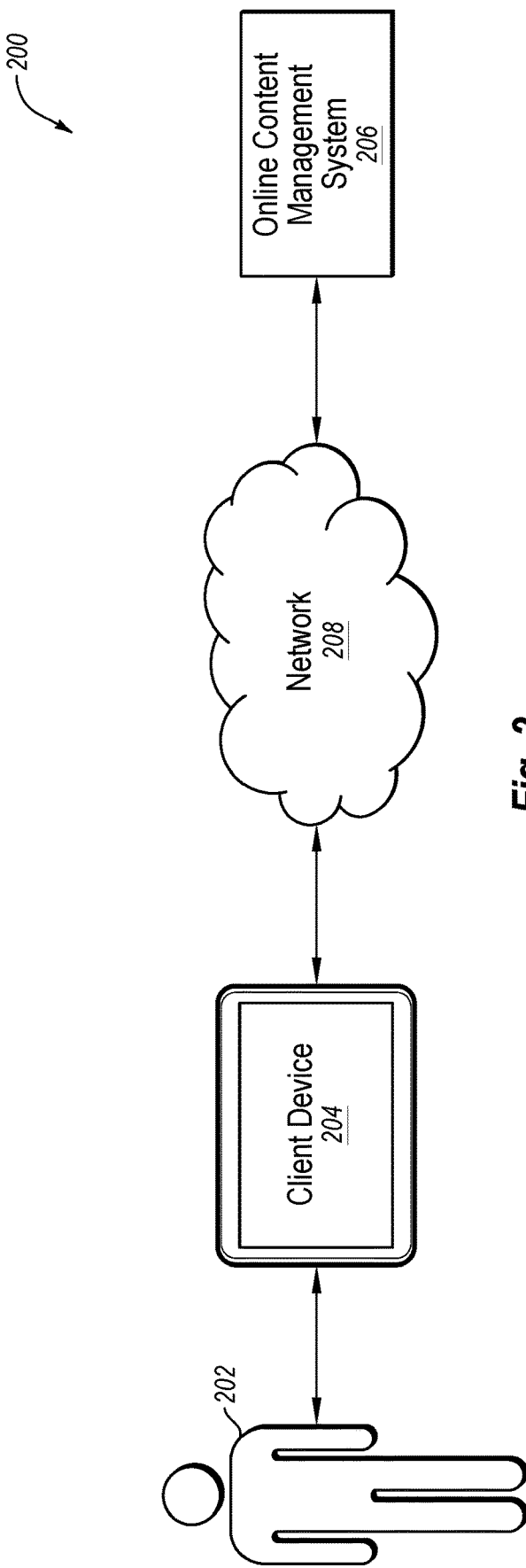
FIG. 2 illustrates a block diagram of an environment for implementing the system of FIG. 1 in accordance with principles described herein.

FIG. 2 illustrates a block diagram of a specific example implementation of system 100. In particular, FIG. 2 illustrates a user 202 and associated client device 204, which may be in communication with online content management system 206 via network 208. In some embodiments, system 100 may be implemented entirely on client device 204. In particular, client device 204 can be configured to perform one or more of the functions described above with respect to system 100. In alternative embodiments, system 100 may be implemented at least partially on online content management system 206. For example, different components and functionality described above in connection with system 100 may be performed by client device 204, online content management system 206 and/or a combination of the two.

In some embodiments, client device 204 may be obtain or otherwise access digital content items. For example, client device 204 can capture or otherwise create digital content items (e.g., using a camera and/or microphone). Additionally or alternatively, client device 204 can receive digital content items from or access digital content items stored by online content management system 206. Client device 204 may further provide one or more digital content items to online content management system 206 over network 208.

In some embodiments, online content management system 206 may perform one or more actions to associate a score with a digital content item. In particular, online content management system 206 may analyze a digital content item and assign one or more scores to the digital content item based on the analysis and any suitable factors/criteria, such as those discussed herein. For example, online content management system 206 may assign a score to a photo based on the presence of a face within the photo. Additionally or alternatively, online content management system 206 may assign a score to the digital content item based on one or more additional factors. For instance, online content management system 206 may assign a score based on a detection of various objects, such as people, facial features, eyes being open, eyes making contact with a camera, etc. In addition, online content management system 206 may assign a score based on a prominence of various objects within the digital content item, such as faces, people, animals, landscapes, or other detected objects. For example, the centrality of a face detected within a digital content item may be associated with a higher score than a digital content item without a face or a digital content item with a face in a less prominent position within the digital content item. Additionally, online content management system 206 can assign a score to a digital content item based on characteristics of the digital content item, such as clarity, sharpness, color, brightness, quality, number of pixels, or other detected and/or determined characteristic of the digital content item.

Additionally or alternatively, online content management system 206 may assign a score based on historical and/or social data associated with the digital item. For example, online content management system 206 may assign a score based on a history of creating, editing, saving, renaming, sharing, and/or rating of a digital content item. Moreover, other factors, such as user-assigned values, user-assigned tags, or other factors may be used when associating a score with a particular digital content item. Further, as indicated above, online content management system 206 can associate multiple individual scores and/or cumulative scores with one or more digital content items based on individual factors or a combination of factors.

Online content management system 206 may provide scores associated with digital content items to client device 204 for use in organizing and/or emphasizing one or more digital content items presented on client device 204. Additional aspects and operations of online management system 204 are set forth below in relation to FIG. 11.

Client device 204 may maintain scores received from online content management system 206 on client device 204 for use in identifying one or more digital content items to emphasize and/or in organizing a presentation of digital content items on client device 204. Additionally, client device 204 may be used to further assign scores and/or modify scores associated with digital content items.

Client device 204 may present digital content items within a graphical user interface on client device 204. For instance, client device 204 may present the digital content in a grid view to user 202 based on the scores obtained from online content management system 206 over network 208. For example, client device 204 may identify from a plurality of digital content items one or more digital content items to selectively emphasize based on the scores associated with the digital content items. Further, user 202 may interact with a graphical user interface on client device 204 to navigate through and/or otherwise interact with a gallery of digital content items including emphasized digital content items.

In some embodiments, client device 204 can provide a graphical user interface in which one or more digital content items are selectively surfaced and/or emphasized with respect to a grid view, lock screen, or a digital content item stream (e.g., a photo stream). For example, client device 204 can call attention to a particular digital content item by emphasizing the digital content item, popping up the digital content item, or providing a push notification, email, or other visual and/or audio indication to call attention to the digital content item. For example, upon determining an expected level of user interest in a particular digital content item based on an associated score, client device 204 can emphasize the digital content item by calling it to attention on a lock screen. In one example, client device 204 can surface a digital content item associated with a particular friend on a lock screen to show the last time a user and the friend were together and to indicate that user 202 and the friend are within physical proximity of each other at a given time.

Moreover, user 202 can interact with a presented digital content item to perform one or more actions associated with a digital content item. For instance, where a digital content item is presented (e.g., emphasized or otherwise), user 202 can identify that the digital content item includes a friend or family member and further select the digital content item via a graphical user interface to share the digital content item with one or more friends. In addition, user 202 can provide a message to accompany the shared digital content item. For example, client device 204 can emphasize, within a graphical user interface, a particular digital content item based on the detected presence of a face within the digital content item. Upon prompting from user 202, client device 204 can prompt the user 202 to create a message, and client device 204 can then share the digital content item and/or the received message with one or more friends of user 202 (e.g., by way of a social network linking the user to the one or more friends).

Figure 10:
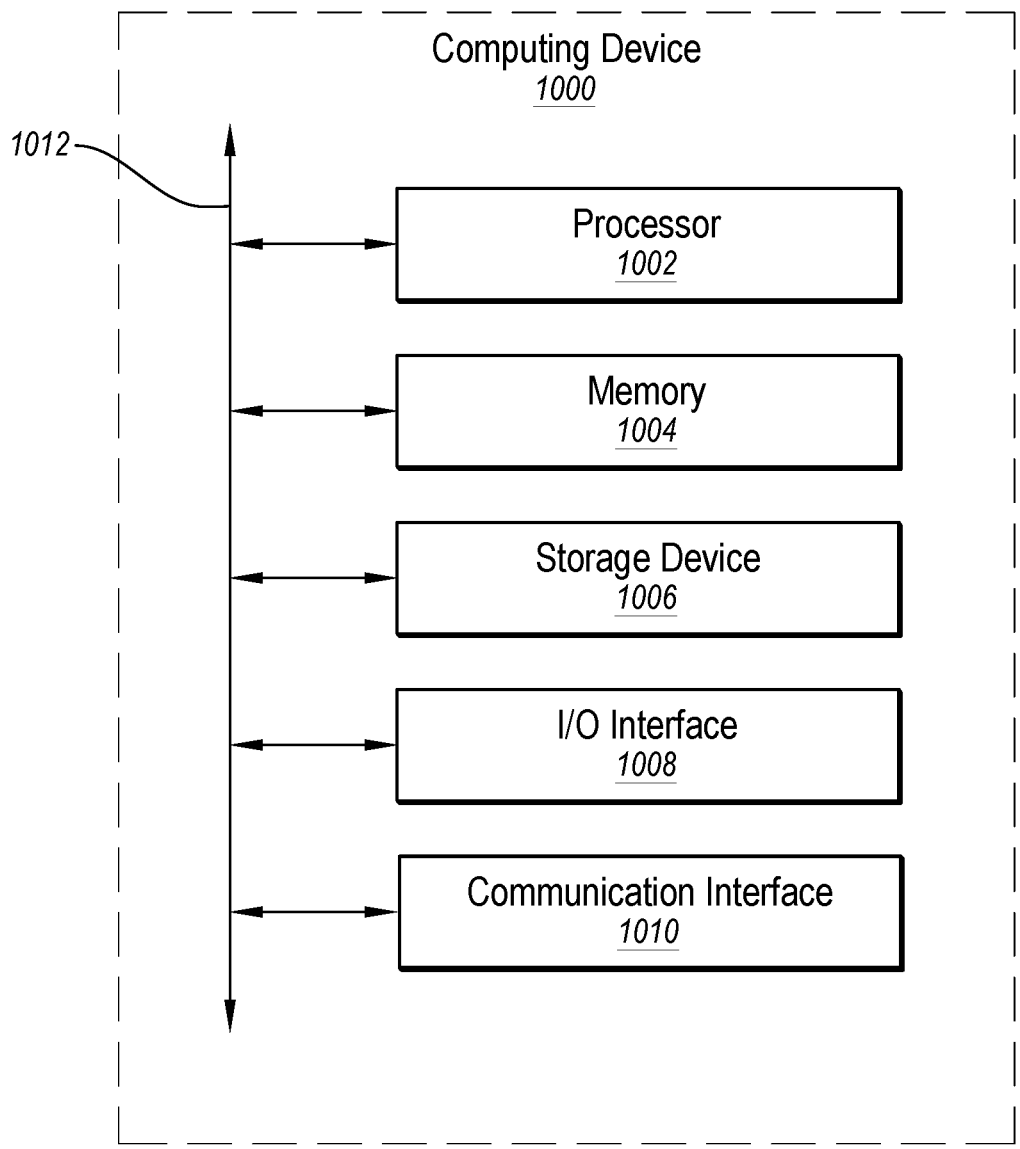
FIG. 10 illustrates a block diagram of an exemplary computing device in accordance with principles described herein.

Client device 204 can include any suitable computing device such as disclosed herein with respect to FIG. 10. In some embodiments, client device 204 may be a handheld device, such as a mobile device (e.g., a smart phone or tablet device). As used herein, the term "handheld device" refers to device sized and configured to be held/operated in a single hand of user 202. In additional or alternative examples, however, client device 202 can be implemented by any other suitable computing device, such as, but not limited to, a laptop or desktop computer, a personal-digital assistant device, and/or any other suitable computing device configured to perform one or more of the processes and/or operations described herein. Additionally, client device 204 may include any suitable input device (e.g., a keypad, one or more input buttons, etc.). In some examples, user 204 may utilize a touch screen to provide one or more touch gestures, interact with the interfaces, and/or provide user input to client device 204. For example, the user can utilize a touch screen to navigate and/or interact with a gallery of digital content items presented by client device 204.

Figure 3:
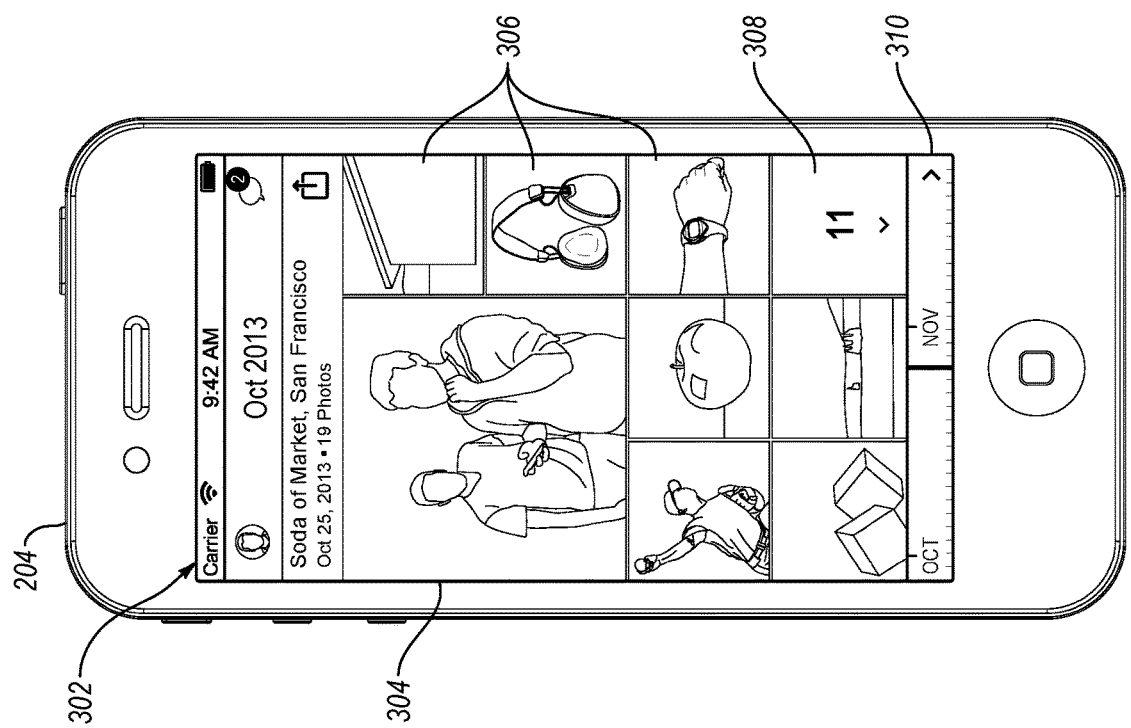

FIG. 3 illustrates an example embodiment of client device 204 presenting a graphical user interface 302 including a gallery of digital content items in a grid configuration. In particular, graphical user interface 302 can include a gallery of thumbnail images representative of the digital content items. Thus, as used herein, images, photos, or other forms of digital content items may be interchangeable with digital content items. As shown, graphical user interface 302 may include photo 304 that is emphasized within graphical user interface 302 relative to photos 306. Further, graphical user interface 302 presents photo 304 with emphasis relative to photos 306. In particular, photo 304 comprises a larger sized and/or larger resolution thumbnail than photos 306 and occupies several (specifically 4) spaces within the grid of graphical user interface 302, while photos 306 each occupy a single space within the grid.

As described herein, client device 204 can emphasize photo 304 relative to photos 306 based on scores associated with photo 304 and photos 306. For instance, photo 304 may be associated with a score that is higher than scores associated with photos 306 as it relates to a particular desired factor or feature. In particular, the higher score of photo 304 can be indicative of a presence of one or more faces and/or facial features within photo 304, while the relatively lower scores associated with photos 306 can be indicative of an absence of a face or of a less prominent face within photos 306.

In some embodiments, client device 204 can emphasize one or more emphasized digital content items based on scores associated with a particular range of digital content items. For instance, client device 204 can emphasize a digital content item having the highest score relative to other digital content items within a predefined range of digital content items (e.g., such as a range of digital content items viewable by a user within a graphical user interface at any particular point in time). For example, as illustrated in FIG. 3, graphical user interface 302 includes a range of eight photos (including photo 304 and photos 306) that are viewable. Within the range of photos, photo 304 may have the highest score with respect to a particular feature or characteristic being emphasized. Accordingly, client device 204 emphasizes photo 304 by using a larger sized thumbnail than is used for photos 306. Although only a single digital content item is emphasized in graphical user interface 302, one will appreciate that client device 204 can simultaneously emphasize multiple digital content items within a viewable portion of graphical user interface 302. Furthermore, although graphical user interface 302 includes a range of eight digital content items that are viewable, one will appreciate that client device 204 can modify graphical user interface 302 to include any suitable number of digital content items that are viewable to the user at a particular time (e.g., by reducing or increasing the size of the viewable digital content items and/or reducing or increasing the number of rows and columns within the grid of digital content items).

In some embodiments, client device 204 may dynamically adapt the emphasis of one or more digital content items based on a user's navigation within graphical user interface 302. For example, if a user scrolls up or down within graphical user interface 302 in order to view additional digital content items, client device 204 may dynamically change which digital content items are emphasized based on the digital content items that are viewable to the user at any particular time as the user is navigating within the graphical user interface 302. To illustrate, if the user scrolls away from photo 304 (e.g., such that photo 304 is no longer viewable within graphical user interface 302), client device 304 may automatically select a different digital content item for emphasis based on what is viewable by the user. In some examples, client device 204 may dynamically emphasize one of photos 306 once photo 304 is no longer viewable and despite the fact that photos 306 were not previously emphasized. As another example, if a user scrolls such that a photo having a higher score than photo 304 becomes visible within graphical user interface 302, client device 204 may automatically emphasize the newly-visible photo and/or deemphasize photo 304 despite the fact that photo 304 is still visible within graphical user interface 302. Accordingly, client device 204 can dynamically adapt in order to emphasize the digital content item having the highest scores and/or expected user interest at any point in the user's experience of graphical user interface 302. In additional or alternative examples, client device 204 can determine beforehand which digital content items to emphasize regardless of what is visible to a user at a particular point in time.

As further illustrated by FIG. 3, graphical user interface 302 can also include additional photos indicator 308 to indicate one or more additional photos are available within a particular group or category of photos (e.g., the group of photos associated with the location/name, "Soda of Market, San Francisco," and associated with the date, Oct. 25, 2013). For example, due to size or space limitations, graphical user interface 302 may initially only show a certain number of photos within each group of photos within a gallery of photos. Additional photos indicator 308 may provide an indication to a user that other additional photos that are not currently presented are also included within a group of photos. For example, as illustrated in FIG. 3, additional photos indicator 308 indicates that eleven other photos are not currently presented within the group of photos. In some embodiments, a user can expand the group of photos by selecting additional photos indicator 308.

In some embodiments, graphical user interface 302 may include scroller 310 for navigating within the gallery of digital content items. In particular, a user can use scroller 310 to scroll within the gallery of digital content items using a simple sliding gesture along any particular length of scroller 310. By sliding the scroller 310 one way or the other, the presentation of digital content items may change to reflect digital content items corresponding to a current position within scroller 310.

Figure 4:
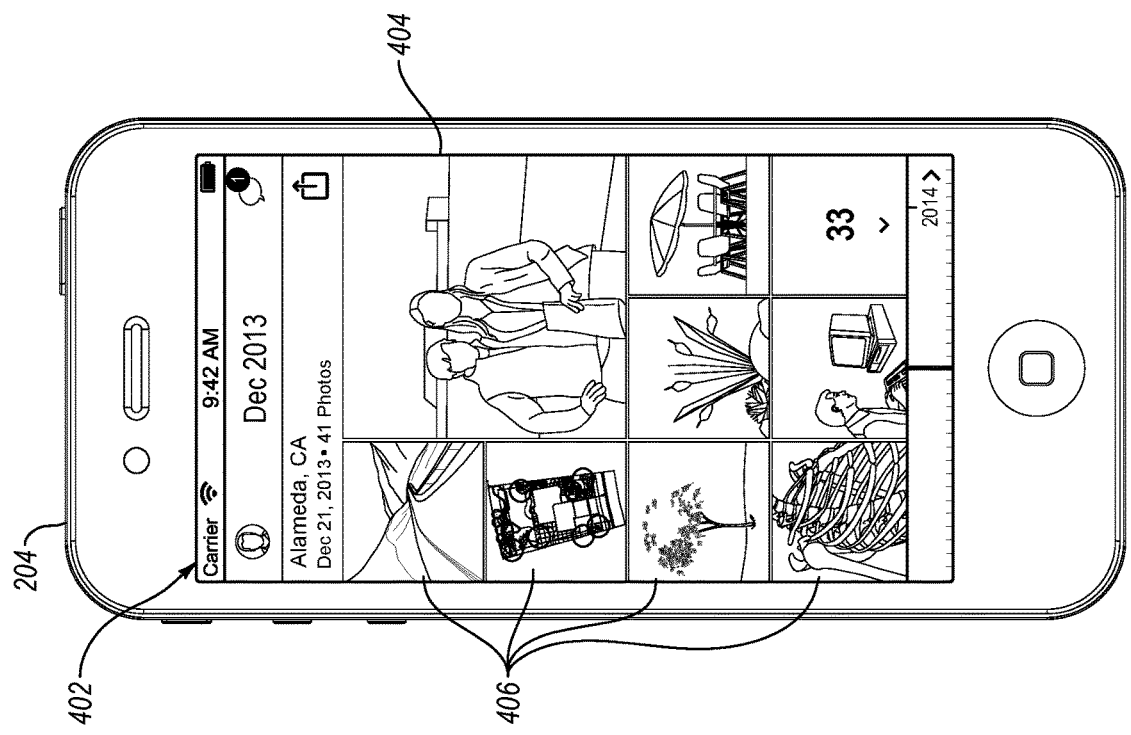
FIGS. 3-8 illustrate example user interfaces for emphasizing digital content in accordance with principles described herein.

FIG. 4 illustrates an additional example graphical user interface 402 for presenting a gallery of digital content items. Graphical user interface 402 may include similar features and functionality as graphical user interface 302 described above in connection with FIG. 3.

Graphical user interface 402 illustrates a gallery of digital content items in a grid configuration. Similar to FIG. 3, FIG. 4 illustrates one example of a group of photos (e.g., the group of photos associated with the location/name, "Alameda, Calif.," and associated with the date, Dec. 21, 2013) including photo 404 and photos 406. As shown, client device 204 can emphasize photo 404 relative to photos 406. In particular, photo 404 occupies an upper, right-hand portion of graphical user interface 402 and is larger than photos 406. In some embodiments, the position of photo 404 within graphical user interface 402 may be based on a variety of factors. For example, emphasized photo 404 may be presented in a particular location within graphical user interface 402 based on the location, position, or order of photo 404 relative to photos 406 within the presented group of photos. For example, graphical user interface 402 may include photo 404 presented in an upper, right portion of graphical user interface 402 because emphasized photo 402 is preceded by one or more of photos 406 within the presented group of photos. Thus, graphical user interface 402 may emphasize photo 404 using a larger photo than photos 406 without substantially reordering photos within the group of photos. Alternatively, graphical user interface 402 may include photo 404 in a particular location independent of the order of emphasized photo relative to photos 406. For example, graphical user interface 402 may always include any photo 404 in an upper right portion of graphical user interface 402 based on one or more user preferences.

Figure 5:
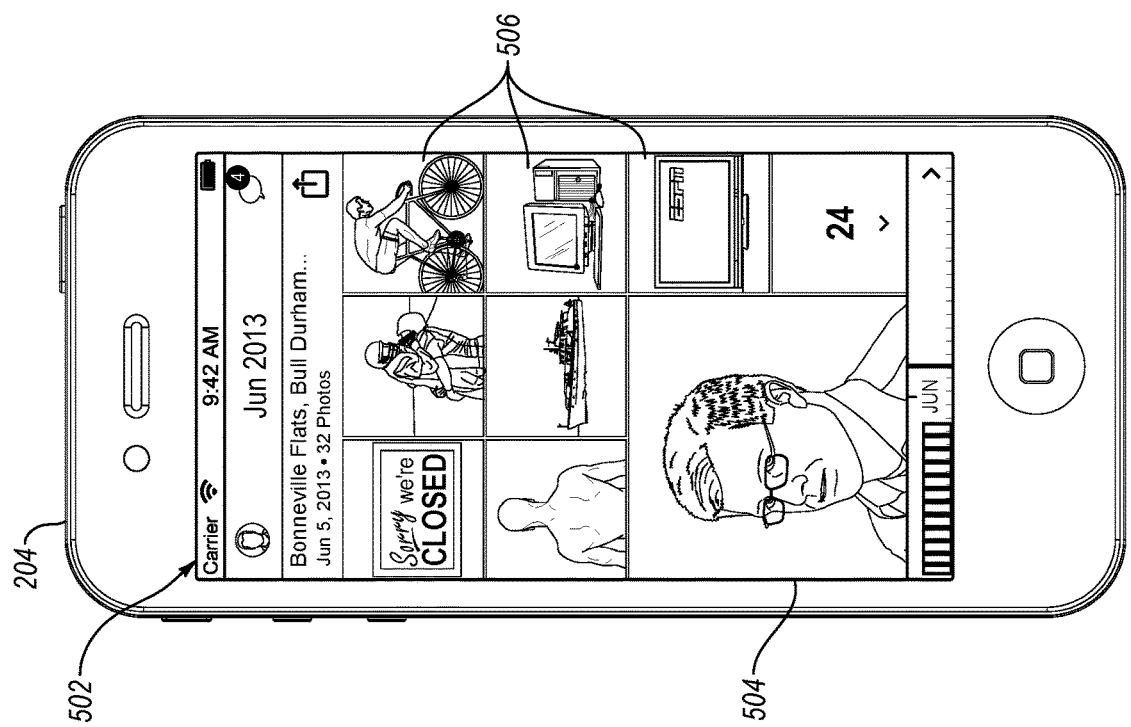

FIG. 5 illustrates another example graphical user interface 502 in accordance with principles described herein. Client device 204 can present graphical user interface 502 including one or more digital content items. In particular, client device 204 can present, via graphical user interface 502, a plurality of digital content items from a gallery of digital content items in a grid configuration. Graphical user interface 502 may include similar features and functionality as graphical user interfaces 302 and 402 described above in connection with FIGS. 3-4.

Graphical user interface 502 illustrates a group of digital content items (e.g., the group of photos associated with the location/name, "Bonneville Flats, Bull Durham . . . ," and associated with the date, Jun. 5, 2013) within a gallery of digital content items. Similar to other examples, graphical user interface 502 illustrates one example of a gallery of photos oriented in a grid configuration, including photo 504 and photos 506. As illustrated, photo 504 is emphasized within graphical user interface 502. In particular, photo 504 is larger than photos 506. Photo 504 is further presented in the lower, left portion of graphical user interface 502. Similar to other embodiments, the position of photo 504 within graphical user interface 504 may be based on the position of emphasized photo 504 within the group of photos, a setting (e.g., a user setting), and/or one or more other factors.

Figure 6:
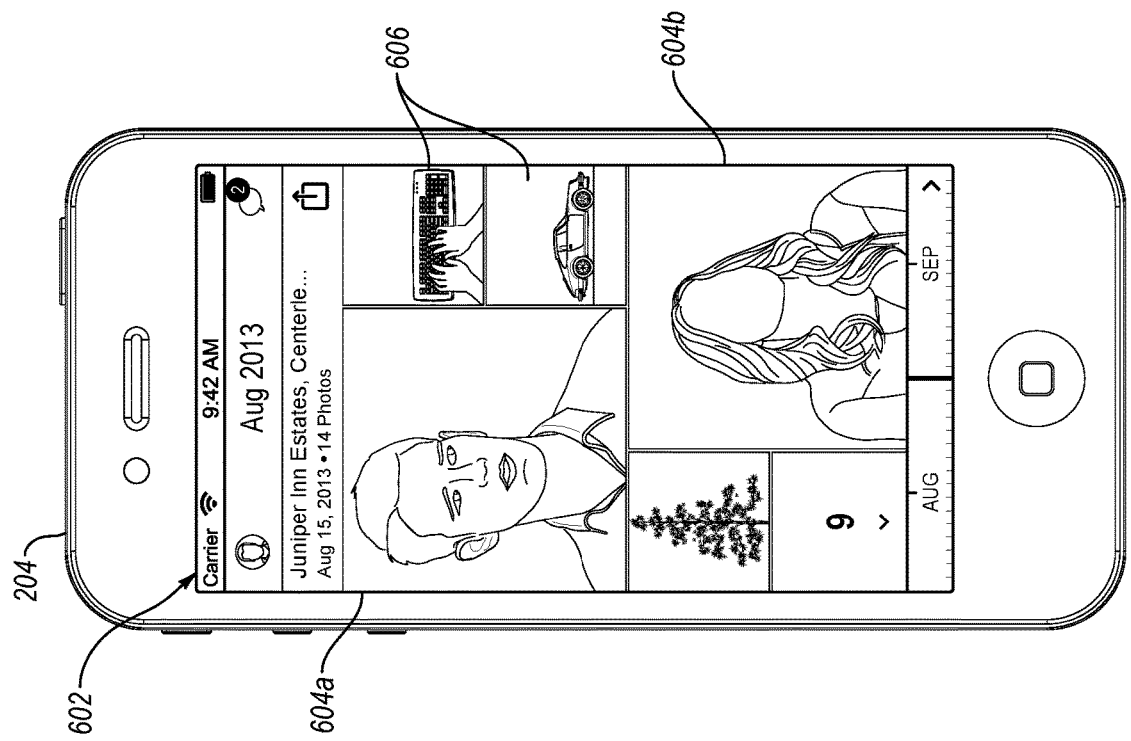

FIG. 6 illustrates another example graphical user interface 602 in accordance with principles described herein. Client device 204 can present graphical user interface 602 including one or more digital content items. In particular, client device 204 can present, via graphical user interface 602, a plurality of digital content items from a gallery of digital content items. Graphical user interface 602 may include similar features and functionality as graphical user interfaces 302, 402, and 502 described above in connection with FIGS. 3-5.

As illustrated in FIG. 6, client device 204 can simultaneously emphasize multiple digital content items within graphical user interface 602. In particular, graphical user interface 602 includes first emphasized photo 604a, second emphasized photo 604b, and photos 606, which are not emphasized. As shown, first emphasized photo 604a is presented prominently in the upper left portion of graphical user interface 602 and second emphasized photo 604b is presented prominently in the lower right portion of graphical user interface 602. First emphasized photo 604a and second emphasized photo 604b are each emphasized using larger-sized images than photos 606. Although first emphasized photo 604a and second emphasized photo 604b are illustrated as being emphasized in a similar manner (e.g., by showing an enlarged version of each photo), one will appreciate that client device 204 can emphasize first emphasized photo 604a in a first manner and emphasize second emphasized photo 604b in a second manner.

Client device 204 can select first emphasized photo 604a and second emphasized photo 604b for emphasis based on any suitable factors, such as described herein. For instance, client device 204 can emphasize first emphasized photo 604a and second emphasized photo 604b based on the detection of faces within first emphasized photo 604a and second emphasized photo 604b (e.g., as indicated by relatively high "face scores" associated with first emphasized photo 604a and second emphasized photo 604b). In additional embodiments, client device 204 can select first emphasized photo 604a and second emphasized photo 604b based on any other suitable factors. In some embodiments, client device 204 can emphasize each of first emphasized photo 604a and second emphasized photo 604b for different reasons and/or based on different factors and corresponding representative scores. For example, client device 204 may select first emphasized photo 604a for emphasis based on the detection of one or more facial features within first emphasized photo 604a (e.g., as represented by a relatively high "face score" associated with first emphasized photo 604a) and select second emphasized photo 604b based on a plurality of social actions taken with respect to second emphasized photo 604b (e.g., as represented by a relatively high "social score" associated with second emphasized photo 604b). Accordingly, client device can emphasize multiple digital content items for distinct reasons, thereby appealing to a user's interest in a multitude of ways within a single user experience with graphical user interface 602.

In some embodiments, the number of digital content items to be emphasized with a current view of graphical user interface 602 may be based on a setting. For example, a user setting may define that a particular number (e.g., two) of digital content items be emphasized within graphical user interface 602. Thus, client device 204 may emphasize a predetermined number of digital content items at a particular time. Alternatively, the number of digital content items emphasized by client device 204 may vary from one moment to the next based on the digital content items presented, scores associated with the digital content items, desired actions for emphasizing the digital content items, available screen space, and/or any other suitable factors.

Figure 7:
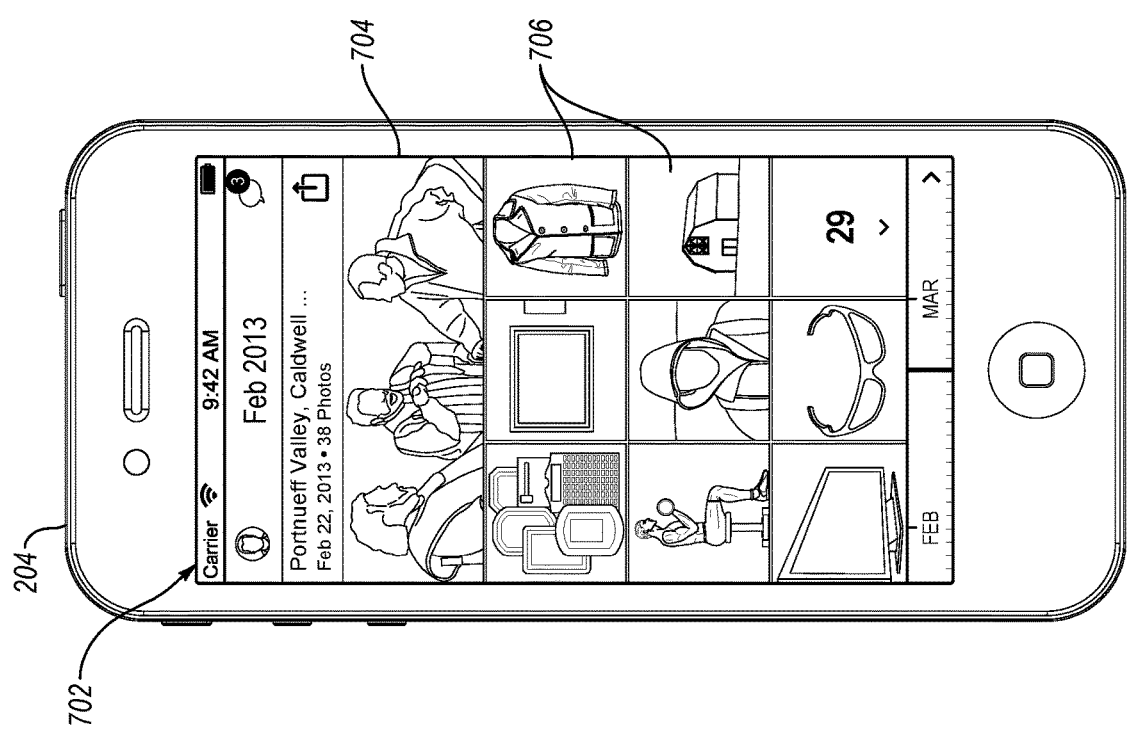

FIG. 7 illustrates another example graphical user interface 702 in accordance with principles described herein. Client device 204 can present graphical user interface 702 including one or more digital content items. In particular, client device 204 can present, via graphical user interface 702, a plurality of digital content items from a gallery of digital content items. Graphical user interface 702 may include similar features and functionality as graphical user interfaces 302, 402, 502, and 602 described above in connection with FIGS. 3-6.

As shown, graphical user interface 702 illustrates a gallery of digital content items in a grid configuration. In particular, graphical user interface 702 illustrates one example of a gallery of photos oriented in a grid configuration, including photo 704 and photos 706. As shown in FIG. 7, client device 204 can emphasize photo 704 by cropping photo 704 to emphasize one or more features detected within photo 704 without including the entire contents of photo 704. In particular, as shown, client device 204 has cropped photo 704 along a horizontal length thereof to emphasize the faces of three people positioned side-by-side without including the contents of photo 704. As shown, photo 704 occupies a rectangular area within the grid of digital content items equivalent to three digital content items placed side by side (e.g., a 3×1 sized area within the grid). Accordingly, client device 204 can emphasize the desired portions or features of photo 704 without taking up too much space within graphical user interface 702.

Figure 8:
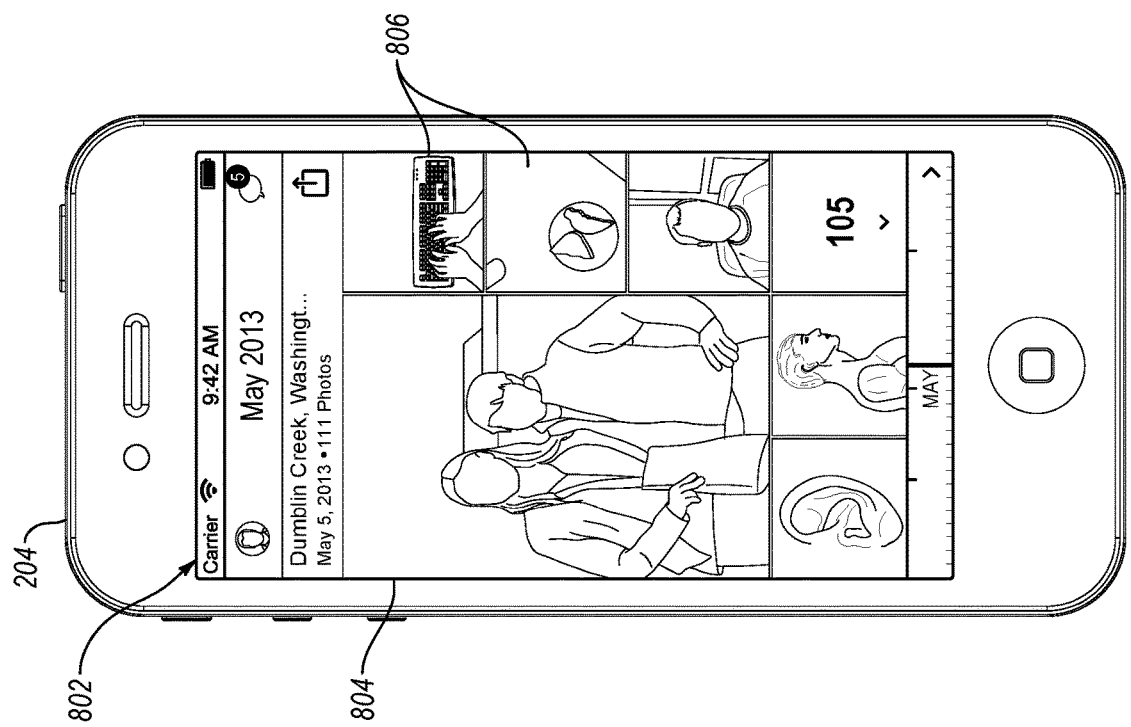

FIG. 8 illustrates another example graphical user interface 802 in accordance with principles described herein. Client device 204 can present graphical user interface 802 including one or more digital content items. In particular, client device 204 can present, via graphical user interface 802, a plurality of digital content items from a gallery of digital content items. Graphical user interface 802 may include similar features and functionality as graphical user interfaces 302, 402, 502, 602, and 702 described above in connection with FIGS. 3-7.

As shown, graphical user interface 802 illustrates a gallery of digital content items in a grid configuration. In particular, graphical user interface 802 illustrates one example of a gallery of photos oriented in a grid configuration, including photo 804 and photos 806. As shown in FIG. 8, client device 204 can emphasize photo 804 along a left portion of graphical user interface 802 and using a larger-sized version of photo 804 relative to photos 806. In particular, photo 804 occupies a rectangular area (e.g., a 2×3 sized area within the grid) equivalent to six regularly-sized photos.

Additionally, and as further shown in FIG. 8, client device 204 can crop photo 804 to emphasize one or more features or objects thereof. In particular, client device 204 can crop photo 804 along a vertical length thereof to emphasize two people standing in photo 804. Accordingly, client device 204 can crop a digital content item to emphasize any desired object thereof or contents therein, regardless of the orientation of the targeted content. Further, graphical user interface 802 may include photo 804 in a presentation that fits within a grid view in a way that still allows space for photos 806 along the side of and below photo 804.

Figure 9:
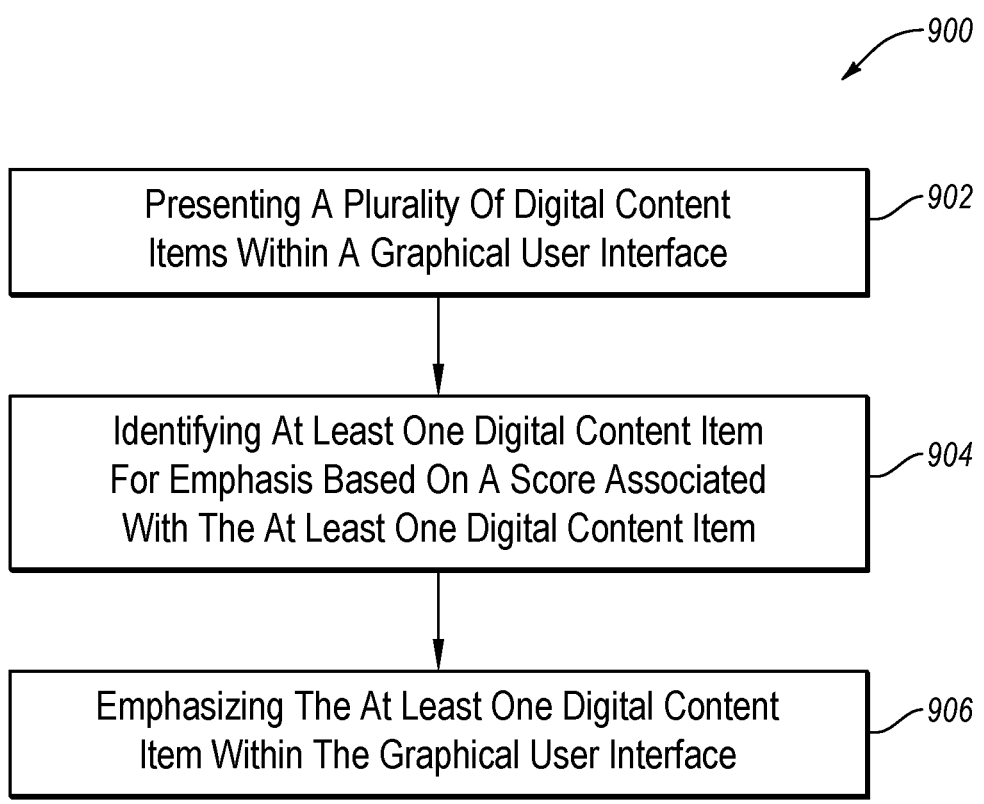
FIG. 9 illustrates a flow diagram illustrating a method of emphasizing digital content in accordance with principles described herein.

FIG. 9 illustrates a flowchart of one exemplary method 900 of selectively emphasizing digital content in accordance with principles described herein. While FIG. 9 illustrates exemplary steps according to one embodiment, other embodiments may omit, add to, reorder, and/or modify any of the steps shown in FIG. 9. One or more steps shown in FIG. 9 may be performed by any of the components illustrated in system 100 illustrated in FIG. 1. Further, one or more steps of method 900 may be performed by client device 204, online content management system 206, or a combination of both.

Method 900 includes step 902, which may include presenting a plurality of digital content items within a graphical user interface. For example, step 902 can include presenting a plurality of digital content items (e.g., images) from a gallery of digital content items in a grid configuration. In particular, as described in more detail herein, user interface manager 102 of system 100 can present a graphical user interface comprising a plurality of photos (e.g., thumbnail images) for experiencing by a user.

Additionally, method 900 includes step 904, which may include identifying at least one digital content item for emphasis based on a score associated with the at least one digital content item. For example, step 904 can include identifying a digital content item based on a score that represents one or more characteristics of the digital content item. In particular, score manager 104 of system 100 can identify a digital content item for emphasis in any suitable manner, such as described herein.

Further, method 900 includes step 906, which may include emphasizing the at least one digital content item within the graphical user interface. For example, step 906 can include emphasizing the at least one digital content item in any way that draws a user's attention to the at least one digital content item. In particular, grid manager 106 of system 100 can emphasize the at least one digital content item in any suitable manner, such as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 10 illustrates a block diagram of exemplary computing device 1000 that may be configured to perform one or more of the processes described above. One will appreciate that smart content emphasis system 100, client device 204, and online content management system 206 each may be implemented by one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular embodiments, storage device 1006 is non-volatile, solid-state memory. In other embodiments, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers.

In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
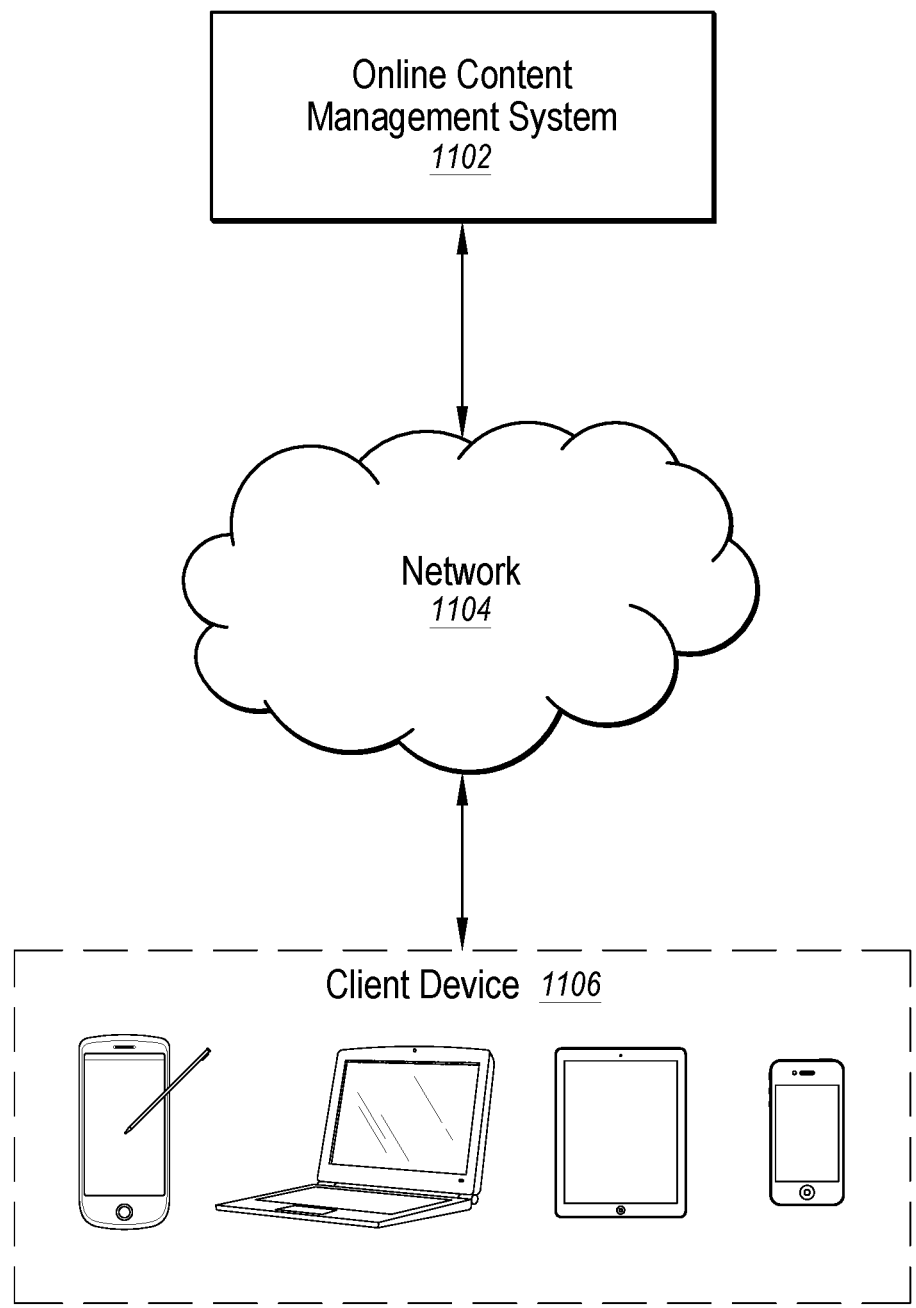
FIG. 11 illustrates a network environment of an online content management system in accordance with principles described herein.

FIG. 11 is a schematic diagram illustrating an online content management system 1102 that can implement one or more features of the present disclosure. Online content management system 1102 may generate, store, manage, receive, and send digital content items. For example, online content management system 1102 may send and receive content items to and from client devices 1106 by way of network 1104. In particular, online content management system 1102 can store and manage a collection of content items. Online content management system 1102 can manage the sharing of content items between computing devices associated with a plurality of users. For instance, online content management system 1102 can facilitate a user sharing a content item with another user of the online content management system.

In particular, online content management system 1102 can manage synchronizing content items across multiple client devices 1106 associated with one or more users. For example, user may edit a content item using client devices 1106. The online content management system 1102 can cause client device 1106 to send the edited content item to online content management system 1102. Online content management system 1102 then synchronizes the edited content item on one or more additional computing devices.

In addition to synchronizing content items across multiple devices, one or more embodiments of the online content management system can provide an efficient storage option for users that have large collections (e.g., galleries) of content items. For example, the online content management system 1102 can store a collection of content items, while the client device 1106 only stores reduced-sized versions of the content items. A user can navigate and browse the reduced-sized versions (e.g., thumbnail images of photos) of the content items on client device 1106. In particular, one way in which a user can experience content items is to browse the reduced-sized versions of the content items on client device 1106. Online content management system 1102 may store any number of reduced size versions (e.g., thumbnails) of digital content items and provide them to client device 1106 at a suitable time (e.g., to allow client device 1106 to emphasize one or more digital content items within a graphical user interface).

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access online content management system 1102.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
providing, for display on a client device, a graphical user interface for navigating through a plurality of digital content items, the plurality of digital content items being arranged in a defined order;
determining a score for each digital content item of the plurality of digital content items;
identifying a first viewable range of digital content items from within the defined order of the plurality of digital content items, the first viewable range of digital content items comprising a first group of consecutive digital content items that can be displayed together on a screen of the client device;
determining, from the first viewable range of digital content items, a first digital content item having a highest score within the first viewable range of digital content items;
based on determining a current display comprises the first viewable range of digital content items, emphasizing, within the graphical user interface, a preview of the first digital content item having the highest score within the first viewable range of digital content items relative to previews of other digital content items within the first viewable range while maintaining the defined order of the plurality of digital content items;
identifying a second viewable range of digital content items from within the defined order of the plurality of digital content items, the second viewable range of digital content items comprising a second group of consecutive digital content items that can be displayed together on the screen of the client device, the second viewable range of digital content items further comprising at least one digital content item outside the first viewable range of digital content items;
determining, from the second viewable range of digital content items, a second digital content item having a highest score within the second viewable range of digital content items;
detecting, with respect to the graphical user interface of the client device, a scrolling input modifying the current display from displaying the first viewable range of digital content items to displaying the second viewable range of digital content items; and
emphasizing, within the graphical user interface and based on detecting the scrolling input, a preview of the second digital content item having the highest score within the second viewable range of digital content items relative to previews of other digital content items within the second viewable range of digital content items while maintaining the defined order of digital content items.

2. The method of claim 1, wherein emphasizing the preview of the first digital content item within the graphical user interface comprises enlarging the preview of the first digital content item relative to the previews of the other digital content items within the first viewable range.

3. The method of claim 1, further comprising:
determining the defined order of digital content items based on a user setting; and
emphasizing the preview of the first digital content item while maintaining the defined order of digital content items based on the user setting.

4. The method of claim 1, wherein emphasizing the preview of the first digital content item within the graphical user interface comprises cropping the preview of the first digital content item by:
analyzing the first digital content item to determine a region of interest of the first digital content item; and
cropping the first digital content item to emphasize the region of interest of the first digital content item.

5. The method of claim 4, wherein the region of interest of the first digital content item comprises one of a face or an object depicted within the first digital content item.

6. The method of claim 1, wherein emphasizing the preview of the first digital content item within the graphical user interface comprises at least one of resizing the first digital content item, reshaping the first digital content item, highlighting the first digital content item, performing a zoom function on the first digital content item, or editing image characteristics of the first digital content item.

7. The method of claim 1, wherein determining the score for each digital content item of the plurality of digital content items comprises:
analyzing each digital content item with multiple analysis techniques; and
combining results from the multiple analysis techniques to generate the score for each digital content item of the plurality of digital content items.

8. A system comprising:
at least one processor; and
a non-transitory computer-readable medium storing instructions that, when executed by the at least one processor, cause the system to:
provide, for display on a client device, a graphical user interface for navigating through a plurality of digital content items, the plurality of digital content items being arranged in a defined order;
determine a score for each digital content item of a plurality of digital content items;
identify a first viewable range of digital content items from within the defined order of the plurality of digital content items, the first viewable range of digital content items comprising a first group of consecutive digital content items that can be displayed together on a screen of the client device;
determine, from the first viewable range of digital content items, a first digital content item having a highest score within the first viewable range of digital content items;
based on determining a current display comprises the first viewable range of digital content items, emphasize, within the graphical user interface, a preview of the first digital content item having the highest score within the first viewable range of digital content items relative to previews of other digital content items within the first viewable range while maintaining the defined order of the plurality of digital content items;

identify a second viewable range of digital content items from within the defined order of the plurality of digital content items, the second viewable range of digital content items comprising a second group of consecutive digital content items that can be displayed together on the screen of the client device, the second viewable range of digital content items further comprising at least one digital content item outside the first viewable range of digital content items;

determine, from the second viewable range of digital content items, a second digital content item having a highest score within the second viewable range of digital content items;

detect, with respect to the graphical user interface of the client device, a scrolling input modifying the current display from displaying the first viewable range of digital content items to displaying the second viewable range of digital content items; and emphasize, within the graphical user interface and based on detecting the scrolling input, a preview of the second digital content item having the highest score within the second viewable range of digital content items relative to previews of other digital content items within the second viewable range of digital content items while maintaining the defined order of digital content items.

9. The system of claim 8, wherein the score for each digital content item of the plurality of digital content items is based on at least one of a facial recognition analysis, an object recognition analysis, or an analysis of historical actions associated with each digital content item.

10. The system of claim 8, wherein emphasizing the preview of the first digital content item within the graphical user interface comprises enlarging the preview of the first digital content item relative to the previews of the other digital content items within the first viewable range.

11. The system of claim 8, wherein emphasizing the preview of the first digital content item within the graphical user interface comprises cropping the preview of the first digital content item.

12. The system of claim 11, wherein cropping the preview of the first digital content item comprises:
analyzing the first digital content item to determine a region of interest of the first digital content item; and
cropping the first digital content item to emphasize the region of interest of the first digital content item.

13. The system of claim 8, wherein emphasizing the preview of the first digital content item within the graphical user interface comprises emphasizing one of a face or an object depicted within the first digital content item.

14. The system of claim 8, wherein emphasizing the preview of the first digital content item within the graphical user interface comprises at least one of resizing the first digital content item, reshaping the first digital content item, highlighting the first digital content item, performing a zoom function on the first digital content item, or editing image characteristics of the first digital content item.

15. A non-transitory computer readable medium storing instructions thereon that, when executed by at least one processor, cause a client device to:
provide, for display on the client device, a graphical user interface for navigating through a plurality of digital content items, the plurality of digital content items being arranged in a defined order;
determine a score for each digital content item of a plurality of digital content items;
identify a first viewable range of digital content items from within the defined order of the plurality of digital content items, the first viewable range of digital content items comprising a first group of consecutive digital content items that can be displayed together on a screen of a client device;
determine, from the first viewable range of digital content items, a first digital content item having a highest score within the first viewable range of digital content items;
based on determining a current display comprises the first viewable range of digital content items, emphasize, within the graphical user interface, a preview of the first digital content item having the highest score within the first viewable range of digital content items relative to previews of other digital content items within the first viewable range while maintaining the defined order of the plurality of digital content items;
identify a second viewable range of digital content items from within the defined order of the plurality of digital content items, the second viewable range of digital content items comprising a second group of consecutive digital content items that can be displayed together on the screen of the client device, the second viewable range of digital content items further comprising at least one digital content item outside the first viewable range of digital content items;
determine, from the second viewable range of digital content items, a second digital content item having a highest score within the second viewable range of digital content items;
detect, with respect to the graphical user interface of the client device, a scrolling input modifying the current display from displaying the first viewable range of digital content items to displaying the second viewable range of digital content items; and
emphasize, within the graphical user interface and based on detecting the scrolling input, a preview of the second digital content item having the highest score within the second viewable range of digital content items relative to previews of other digital content items within the second viewable range of digital content items while maintaining the defined order of digital content items.

16. The non-transitory computer readable medium of claim 15, wherein emphasizing the preview of the first digital content item comprises cropping the preview of the first digital content item to emphasize a particular portion of the first digital content item.

17. The non-transitory computer readable medium of claim 16, wherein cropping the preview of the first digital content item comprises cropping the preview to have a horizontal configuration or vertical configuration within the graphical user interface.

18. The non-transitory computer readable medium of claim 15, wherein emphasizing the preview of the first digital content item within the graphical user interface comprises enlarging the preview of the first digital content item relative to the previews of the one or more other digital content items within the first viewable range.

19. The non-transitory computer readable medium of claim 15, further comprising emphasizing the preview of the first digital content item without reordering the plurality of digital content items within the graphical user interface.

20. The non-transitory computer readable medium of claim 15, wherein determining the score for each digital content item of the plurality of digital content items comprises:
- analyzing each digital content item with multiple analysis techniques; and
- combining results from the multiple analysis techniques to generate the score for each digital content item of the plurality of digital content items.

* * * * *